Aug. 16, 1949.　　　　H. F. FLOWERS　　　　2,479,333
BRAKE MECHANISM FOR SEPARATE SWINGING WHEEL TRUCKS
Filed June 13, 1946　　　　　　　　　　　　　3 Sheets-Sheet 1
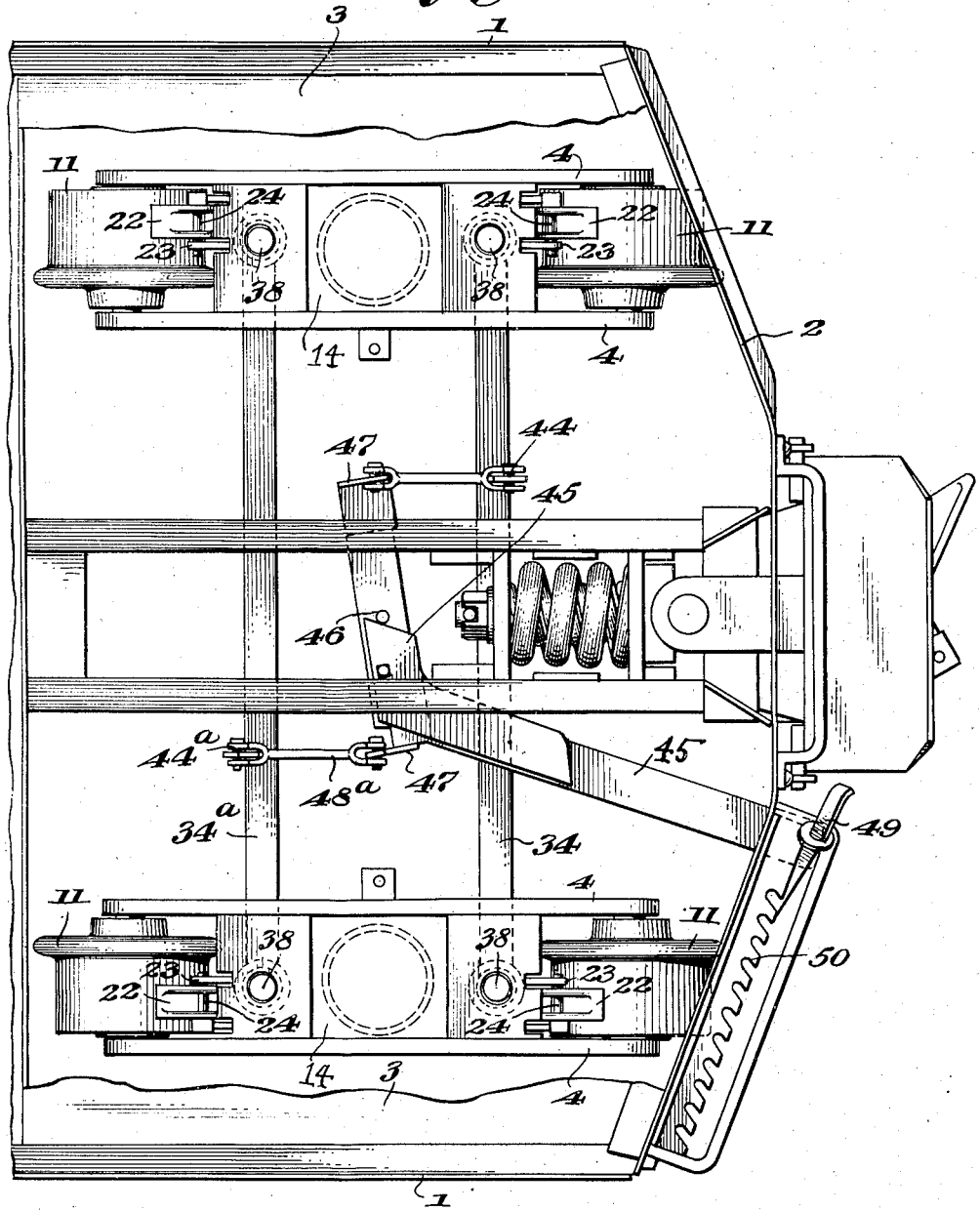
INVENTOR.
Henry Fort Flowers
BY
Mason, Porter, Sillert Stewart
ATTYS.

Aug. 16, 1949.  H. F. FLOWERS  2,479,333
BRAKE MECHANISM FOR SEPARATE SWINGING WHEEL TRUCKS
Filed June 13, 1946  3 Sheets-Sheet 2
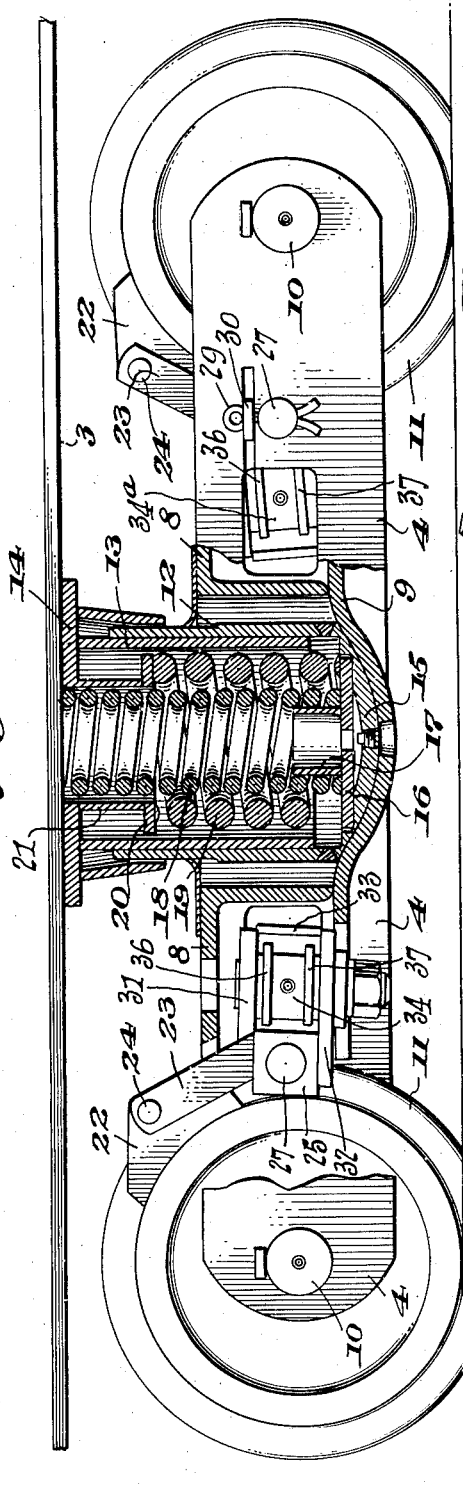
INVENTOR.
Henry Fort Flowers
BY
Mason, Porter, Siller & Stewart
ATTYS.

Aug. 16, 1949.  H. F. FLOWERS  2,479,333
BRAKE MECHANISM FOR SEPARATE SWINGING WHEEL TRUCKS
Filed June 13, 1946  3 Sheets-Sheet 3
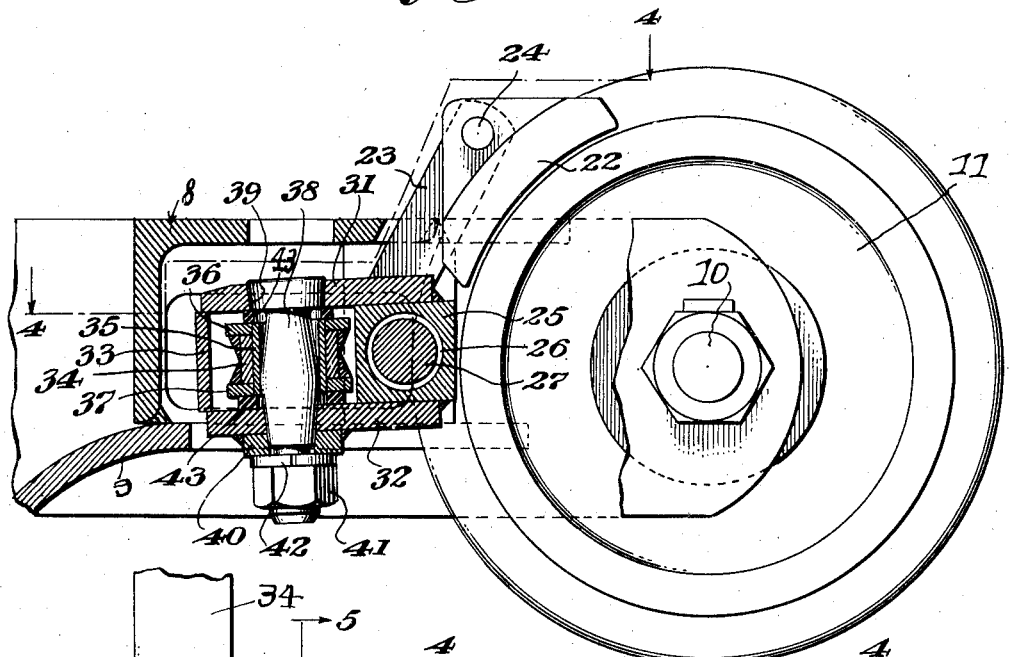
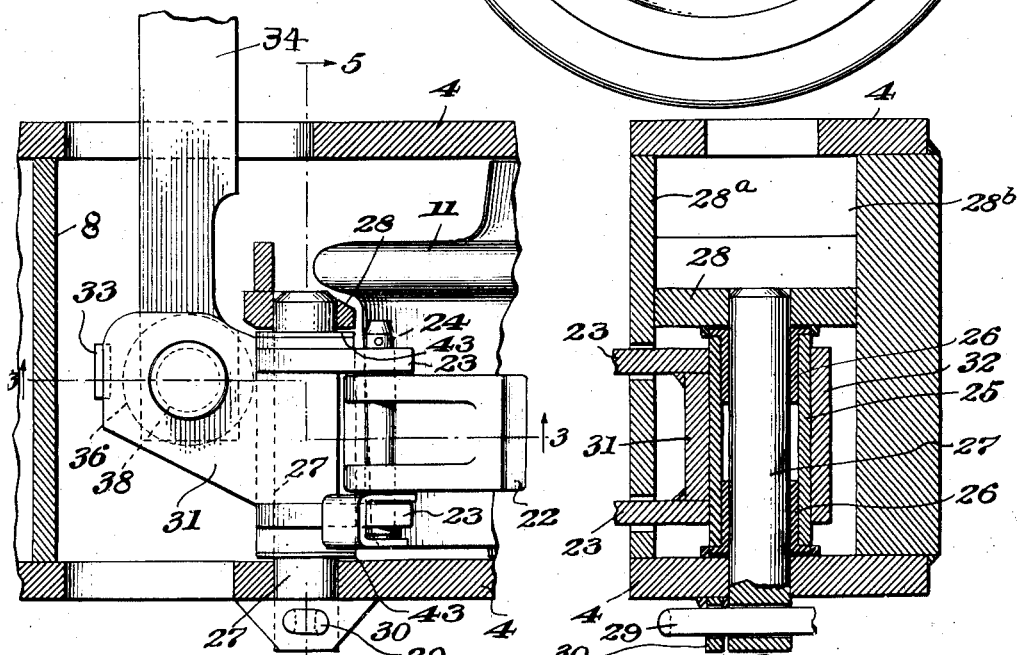
INVENTOR.
Henry Fort Flowers
BY
Mason, Porter, Diller & Stewart
ATTYS.

Patented Aug. 16, 1949

2,479,333

UNITED STATES PATENT OFFICE 2,479,333

BRAKE MECHANISM FOR SEPARATE SWINGING WHEEL TRUCKS

Henry Fort Flowers, Findlay, Ohio

Application June 13, 1946, Serial No. 676,503

5 Claims. (Cl. 188—52)

The invention relates to new and useful improvements in a braking mechanism for rail vehicles and more particularly a rail vehicle wherein the body is mounted on trucks each of which is turnable about a vertical axis, oscillatable on a horizontal axis and movable vertically relative to the body of the vehicle.

An object of the invention is to provide a braking mechanism for the wheels of a truck wherein the actuating mechanism for applying the brake is disposed between the side frames of the truck and also between the wheel and the body support on the truck and wherein said actuating mechanism is operated by the tie bar connecting opposed trucks through the twisting of the tie bar about its longitudinal axis.

A further object of the invention is to provide a braking mechanism for each wheel of the truck wherein each braking mechanism has associated therewith a tie bar connecting the opposed struts and wherein means is provided for manually and simultaneously twisting the tie bars for operating the braking mechanisms.

These and other objects will in part be obvious and will in part be hereinafter more fully disclosed.

In the drawings which show by way of illustration one embodiment of the invention, Figure 1 is a plan view of the front end portion of a rail vehicle having trucks and embodying the improved braking mechanism, the body portion being broken away to show the truck and braking mechanism beneath the same, Figure 2 is a view partly in side elevation and partly in section of one of the trucks, Figure 3 is an enlarged vertical sectional detail through a portion of the truck frame and showing the brake shoe and means for operating the same from the tie bar, the connection between the tie bar and the brake actuating device being in section, Figure 4 is a view in horizontal section on the line 4—4 of Figure 3 and showing the brake shoe supporting means, the actuating means therefor and the tie bar connection to said actuating means, Figure 5 is a sectional view on the line 5—5 of Figure 4, Figure 6 is a perspective view showing the connection between the actuating lever and the tie bars, Figure 7 is a view of the brake operating mechanism at the end of the vehicle, and Figure 8 is a view of a brake lever mounting.

The rail vehicle embodying the improvements includes a body mounted on opposed trucks arranged at each end thereof. Each truck includes side frames, wheels arranged in tandem at the ends thereof, and a body support centrally between the ends of the truck frame.

The present improvement has particularly to do with the braking mechanism for the wheels of the trucks. Each truck is equipped with independent braking mechanisms for the wheels of the truck. Each braking mechanism includes a brake shoe, a supporting sleeve therefor which is mounted on a pivot extending through the side frames of the truck. This sleeve is preferably rectangular in cross section and has projecting arms formed rigid therewith which are disposed between the side frames of the truck. A tie bar extending from one truck to the opposed truck is connected to these arms by a pivot pin so that the twisting of the tie bar through the arms will oscillate the sleeve and move the brake shoe into and out of contact with the wheel associated therewith. With each pair of opposed trucks there are two tie bars independently connected to the braking mechanisms associated therewith and these tie bars are simultaneously twisted by means of a lever which is manually operated.

It is thought that the invention will be better understood by a detailed description of the illustrated embodiment thereof. In said illustration, the body of the rail vehicle is constructed of plates mostly of rectangular shape which are connected by welding and riveting so as to provide a rigid body structure. The body side plates 1, 1 and the end plate 2 are connected together by welding and also welded thereto is a floor plate 3 which is relatively heavy and extends from one side of the car to the other. Beneath this floor plate are the supporting trucks for the body. The wheel trucks are all of similar construction and a detailed description of one will answer for all.

Each wheel truck includes side frames 4, 4 which are formed of heavy plates. These side plates are connected together by transverse angle plates 8, 8 and a gimbal supporting plate 9. The side plates and the cross plates are welded into a rigid wheel frame structure. There are wheel axles 10, 10 at each end of the frame which support flanged wheels 11, 11. These wheel axles are rigidly connected to the side members and further aid in forming a rigid wheel frame structure. Mounted on the gimbal supporting member 9 is a body supporting gimbal 12. This member 12 is in the form of a sleeve and is adapted to receive a king post 13 rigidly connected to a plate 14 which in turn is rigidly connected to the floor plate 3. The body supporting gimbal 12 is provided with flat guide members which engage the side frames 5, 5. The bottom portion of the body supporting gimbal 12 is semi-cylindrical as indicated at 15. The gimbal supporting plate 9 is also semi-cylindrical and therefore the body supporting gimbal 12 can shift on this gimbal supporting plate 9 and this will permit the truck to oscillate about a horizontal axis. The body supporting member 12 can turn on the king post about a vertical axis. Mounting in the body supporting gimbal 12 is an abutment plate 16 having a sleeve 17 rigidly attached thereto. A light spring 18 surrounds this sleeve and extends between the abutment plate 16 and the floor plate 3 of the vehicle. There is a heavy spring 19 which bears on the abutment plate 16 and on an abutment plate 20 carried by a sleeve 21 which is rigidly attached to the plate 14. The body of the car rests on these springs and the body may move up and down on the trucks or the trucks passing over a rough track may move up and down relative to the body.

From the above description, it is noted that each wheel truck is capable of oscillation about a horizontal axis. It is also capable of swinging about a vertical axis and the body may move up and down relative to the truck frame. This specific means for supporting the body per se forms no part of the present invention and further detailed description thereof is not thought necessary.

There is a braking mechanism associated with each wheel of the truck. Each braking mechanism includes a brake shoe 22 mounted on arms 23, 23 by means of a pivot bolt 24. These arms 23, 23 are rigidly attached by welding to a sleeve 25 which is rectangular in cross section and provided with a central cylindrical bore therethrough. Within the sleeve 25 are bushings 26 and a pivot pin 27 extends through the outer side frame 4 and into a cross plate 28. This cross plate 28 is connected to a top plate 28a and a bottom plate 28b which in turn are connected to the side frames 4, 4 all making up a unit structure so that the sleeve is disposed between the side frames and supported thereby. The pivot bolt is held in place by a pivot pin lock or cotter 29 which extends through a bracket 30 welded to the side frame member 4.

Welded to the upper face of the sleeve 25 is an arm 31. Also welded to the lower face of this sleeve 25 is an arm 32. These arms are connected by a plate 33 and the arms and the sleeve are all rigidly connected together by welding so as to form a unit structure.

A tie bar 34 extends from one truck to the other. This tie bar extends through an opening in the inner side frame and the end of the tie bar is disposed between the arms 31 and 32. There is an opening extending through the end of the tie bar and in this opening is placed a bushing 35 (see Fig. 3). A circular plate 36 is welded to the upper side of the tie bar and a circular plate 37 is welded to the under side thereof. The bushing extends through these circular plates. A pivot bolt 38 has the upper end thereof tapered as indicated at 39 and this tapered end of the pivot bolt fits in a tapered socket in the arm 31. The lower end of the pivot bolt is likewise tapered and fits in the arm 32. There is a plate 40 welded to the arm 32 and the pivot bolt extends through this plate 40. A nut 41 is threaded onto the lower end of the pivot bolt. A lock washer 42 is disposed between the nut and the plate 40. The body portion of the pivot bolt 38 is curved outwardly so as to form a convex line curvature contact with the bushing 35. This enables the end of the tie bar to have a slight play in its connection to the brake actuating arm so that the truck is free to oscillate through limited extent about a horizontal axis and to swing also about a vertical axis. The plates 36 and 37 are spaced away from the arms 31 and 32 respectively and disposed between these plates and the arms are rubber sealing gaskets 43, 43. There is a tie bar 34a connecting the braking mechanism associated with the rear wheels of the opposed trucks.

The tie bar 34 is provided with a rigid arm 44 which is welded to the tie bar and extends upwardly therefrom. As shown in detail in Figure 6, there is a similar arm 44a rigidly connected to the tie bar 34a. Pivotally mounted on a supporting bracket attached to the under side of the floor plate 3 is an actuating lever 45 (see Figure 7). This lever 45 is pivoted intermediate its ends, as indicated at 46. At one end of the lever is an upstanding flange 47 which is pivotally connected to a link 48 and its opposite end is attached to the arm 44 of the tie bar 34. At the other end of the lever 45 is an upwardly extending flange 47a which is connected to a link 48a and the link 48a is in turn connected to the arm 44a. This lever 45 extends to the front end of the body and has an upturned end 45a connected by a link 45b to an actuating hand operated member 49 which may be shifted so as to swing the lever and be locked in its shifted position by a rack bar 50. When this lever is shifted, the tie bars will be simultaneously twisted, one in a clockwise direction and the other in a counter-clockwise direction and this will bring about a swinging of the actuating mechanism for the brake shoes so as to cause each brake shoe on the opposed trucks to contact with the wheels for retarding the movement thereof. When the lever is swung in the opposite direction, each tie bar will be turned in an opposite direction for releasing the brake shoes.

It will be noted that the connection of the tie bars with the braking mechanism which in turn serves as a connection between the tie bars and the opposed truck frames is located between the wheel and the body support. It is also noted that the brake supporting and actuating means therefor is located between the side frames. This makes a very rigid structure permitting the movements of one truck frame about a vertical axis to be positively transmitted to the opposite truck frame. It also provides a means whereby the tie bars through the twisting of the same about their longitudinal axes can actuate very effectively the brake shoes.

I claim:

1. A rail vehicle comprising a body, opposed independent wheel trucks on which the body is mounted, each wheel truck including side frames, wheels mounted in tandem between the side frames, a supporting means disposed intermediate the ends of the side frames on which the body is mounted, said supporting means being constructed so as to permit the wheel truck to swing about a vertical axis, a sleeve pivotally supported between the side frames and disposed between the wheel and the body supporting means, arms rigidly carried by said sleeve, a brake shoe pivotally supported by said arms, actuating arms rigidly attached to the sleeve, and a tie bar extending from one opposed truck to the other and having the ends thereof connected to the actuating arms of the respective braking mechanisms whereby endwise movement of the tie bar will impart oscillations of one truck about a vertical axis to the other truck and whereby the turning of the tie bar about a longitudinal axis will actuate the arms carrying the brake shoe for moving said shoe into and out of contact with the wheel associated therewith.

2. A rail vehicle comprising a body, opposed independent wheel trucks on which the body is mounted, each wheel truck including side frames, wheels mounted in tandem between the side frames, a supporting means disposed intermediate the ends of the side frames on which the body is mounted, said supporting means being constructed so as to permit the wheel truck to swing about a vertical axis, a braking mechanism for each wheel of the truck including a sleeve pivotally supported between a wheel and the body supporting means, arms rigidly carried by said sleeve, a brake shoe pivotally supported by said arms, actuating arms rigidly attached to the sleeve and a tie bar associated with the braking mechanism for the front wheels and a tie bar associated with the braking mechanism for the rear wheels of the opposed trucks, each tie bar having the ends thereof connected to the actuating arms of the respective braking mechanisms with which they are associated whereby the endwise movement of the tie bars will impart oscillations of one truck about a vertical axis to the other and whereby the turning of the tie bars will actuate the arms carrying the brake shoes for moving said shoes into and out of contact with the wheel associated therewith.

3. A rail vehicle comprising a body, opposed independent wheel trucks on which the body is mounted, each wheel truck including side frames, wheels mounted in tandem between the side frames, a supporting means disposed intermediate the ends of the side frames on which the body is mounted, said supporting means being constructed so as to permit the wheel truck to swing about a vertical axis, to oscillate in the plane of the wheels and move bodily vertically relative to the body, a sleeve pivotally supported between the side frames and disposed between the wheel and the body supporting means, arms rigidly carried by said sleeve, a brake shoe pivotally supported by said arms, actuating arms rigidly attached to the sleeve, a tie bar extending from one of the opposed trucks to the other, and means for pivotally connecting the ends of the tie bar to the actuating arms of the respective braking mechanisms, such pivotal constructions being such that the endwise movement of the tie bars will impart oscillations of one truck about a vertical axis to the other and permit each truck to independently oscillate about a horizontal axis and to move bodily vertically relative to the body of the vehicle and whereby the twisting of the tie bar will actuate the arms carrying the brake shoe for moving the brake shoe into and out of contact with the wheel associated therewith.

4. A rail vehicle comprising a body, opposed independent wheel trucks on which the body is mounted, each wheel truck including side frames, wheels mounted in tandem between the side frames, a supporting means disposed intermediate the ends of the side frames on which the body is mounted, said supporting means being constructed so as to permit the wheel truck to swing about a vertical axis, to oscillate in the plane of the wheels and move bodily vertically relative to the body, a sleeve pivotally supported between the side frames and disposed between the wheel and the body supporting means, arms rigidly carried by said sleeve, a brake shoe pivotally supported by said arms, parallel spaced actuating arms rigidly attached to the upper and lower sides of the sleeve, a tie bar extending from one of the opposed trucks to the other and having the ends thereof extending between the actuating arms of the respective braking mechanisms, a pivot pin carried by the actuating arms and extending through the ends of each pair of actuating arms and the end of the tie bar, said pivot pin being shaped so as to permit a slight turning movement of the tie bar on said pivot pin, said tie bar when moved endwise operating to impart oscillations to the opposed trucks and when turned about its longitudinal axis operating to actuate the arms carrying the brake shoe for moving the shoe into and out of contact with the wheel associated therewith.

5. A rail vehicle comprising a body, opposed independent wheel trucks on which the body is mounted, each wheel truck including side frames, wheels mounted in tandem between the side frames, a supporting means disposed intermediate the ends of the side frames on which the body is mounted, said supporting means being constructed so as to permit the wheel truck to swing about a vertical axis, a braking mechanism for each wheel of the truck including a sleeve pivotally supported between a wheel and the body supporting means, arms rigidly carried by said sleeve, a brake shoe pivotally supported by said arms, actuating arms rigidly attached to the sleeve and a tie bar associated with the braking mechanism for the front wheels and a tie bar associated with the braking mechanism for the rear wheels of the opposed trucks, each tie bar having the ends thereof connected to the actuating arms of the respective braking mechanisms with which they are associated whereby the endwise movement of the tie bars will impart oscillations of one truck about a vertical axis to the other and whereby the turning of the tie bars will actuate the arms carrying the brake shoes for moving said shoes into and out of contact with the wheel associated therewith, a manually actuated lever pivoted to the under side of the body of the vehicle, arms carried by each tie bar, and links connecting the ends of the lever with the respective arms whereby when said lever is oscillated, the tie bars will be turned in opposite directions about their respective longitudinal axes.

HENRY FORT FLOWERS.

REFERENCES CITED

The following references are of record in the file of this patent:

UNITED STATES PATENTS

| Number | Name | Date |
| --- | --- | --- |
| 1,092,814 | Kellogg | Apr. 7, 1914 |
| 2,063,545 | Flowers | Dec. 8, 1936 |
| 2,250,554 | Schroeder | July 29, 1941 |